UNITED STATES PATENT OFFICE.

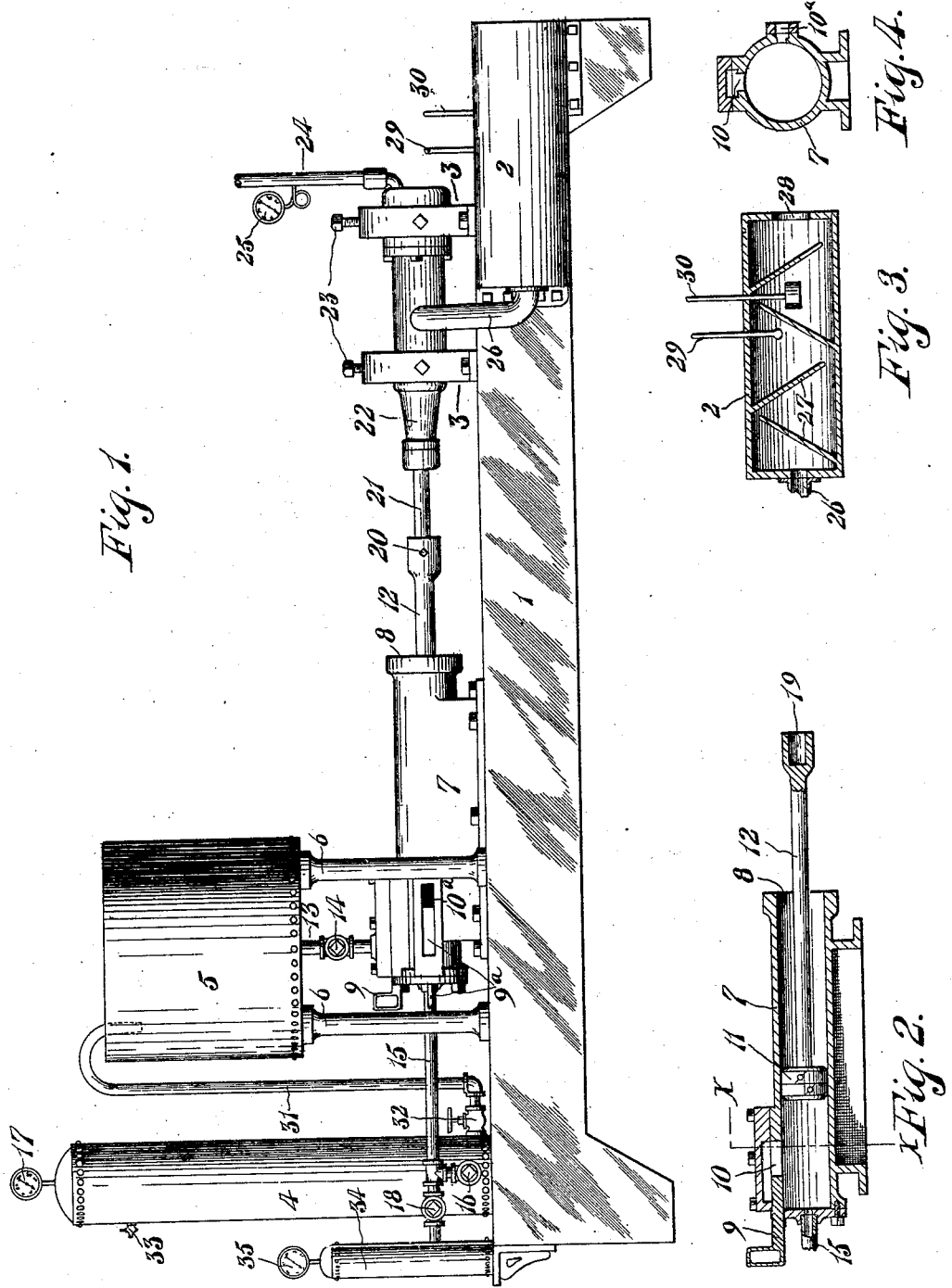

ROBERT ALLISON CHAMBERS, OF NEW GLASGOW, NOVA SCOTIA, CANADA.

METHOD OF TESTING PNEUMATIC TOOLS.

No. 842,136.     Specification of Letters Patent.     Patented Jan. 22, 1907.

Application filed July 23, 1906. Serial No. 327,293.

*To all whom it may concern:*

Be it known that I, ROBERT ALLISON CHAMBERS, of the town of New Glasgow, in the Province of Nova Scotia and Dominion of Canada, have invented certain new and useful Improvements in Methods of Testing Pneumatic Tools, of which the following is a full, clear, and exact description.

My invention relates to a method of testing pneumatic tools, such as rock-drills and similar machines. In operating such machines it frequently becomes necessary to know the approximate efficiency of the machine after certain parts have become worn—that is to say, it is important for the operator to know whether the work done is proportionate to the amount of air or other motive fluid consumed by the machine in order that worn parts may be replaced to advantage. Without the use of such a device a machine may be operated at great expense.

The object of this invention is to provide a simple and inexpensive method of testing such machines, and thereby maintaining all the parts at a certain standard efficiency. This object is accomplished by the method of operating a rock-drill or similar instrument against a column of air or other fluid and measuring the impinging or striking force of the machine against the amount of energy necessary to produce such a result. A machine, such as a pneumatic drill, is connected to the piston of a testing-cylinder, which piston is driven by the machine to be tested and allowed to impinge against a column of water which is connected to a compressor-tank. The amount of air thus compressed is measured against the air consumed in driving the machine, and from this data the efficiency is readily obtained.

Referring to the drawings which illustrate my invention, Figure 1 is a side elevation of the device, showing the relative position of the parts. Fig. 2 is a vertical longitudinal section through the center of the cylinder. Fig. 3 is a vertical longitudinal section through the center of the exhaust-muffler. Fig. 4 is a cross-sectional view of the cylinder on the line X X of Fig. 2.

In the above-defined figures, 1 designates the frame of the machine, one end of which carries an exhaust-muffler 2 and a pair of adjustable clamps 3 and the other end a closed cylindrical tank 4 and an open reservoir 5, supported on a plurality of columns 6. Toward the center the frame 1 carries a cylinder 7, open at the end 8. The cylinder 7 is provided with adjustable gates 9 and $9^a$, which open or close ports 10 and $10^a$ in the cylinder. Inside the cylinder 7 is a piston 11, which when operated by the piston-rod 12 retreats and allows water from the tank 5 to enter the cylinder through the pipe 13 and check-valve 14. On the forward stroke of the piston the water is allowed to escape through the port $10^a$ on the side of the cylinder until the piston passes this port. When the piston has passed the port $10^a$, the resistance to its forward motion due to the water column will cause an impact which forces the water through the pipe 15 past the check-valve 16 and into the tank 4, compressing the air therein, which pressure is registered by the gage 17. These repeated impacts correspond to the blows when in operation. The vacuum caused in the tank 34 by the return stroke of the piston 11 is maintained by the check-valve 18 and registered by the gage 35.

The end of the piston-rod 12 is hollow at 19 and provided with a set-screw 20 for securing the end of the cutter or other member 21, actuated by the pneumatic tool 22, which is firmly set up in the clamps 3 by means of adjusting-screws 23. The supply-pipe 24 of the tool 22 is provided with a pressure-gage 25, and the exhaust-pipe 26 discharges into the muffler 2. The muffler 2 contains a plurality of angularly-disposed baffle-plates 27, which cause the exhaust to be equally distributed throughout the muffler 2 before it escapes through the orifice 28. A thermometer 29 and a water or mercury column 30 are inserted into the muffler 2 to ascertain the temperature and pressure of the exhaust. A pipe 31, provided with a valve 32, leads from the bottom of the tank 4 into the reservoir 5, so that when the test is finished the valve 32 may be opened and the pressure of air in the tank 4 utilized to return the water to the reservoir 5. As a further auxiliary I provide an air-cock 33 in the tank 4. I also provide a closed tank 34, attached to the pipe 15 beyond the check-valve 18, said tank provided with a vacuum-gage 35. The return stroke of the piston creates a partial vacuum in the tank 34, which vacuum corresponds to the resistance to the return motion of the cutter 21 experienced in actual operation.

From the foregoing description the operation of my device will be apparent. The air or other motive fluid required for driving the machine is measured by means of readings upon the pressure-gage 25, the gages 29 and 30, and the area of the exhaust forces 28. The energy consumed may be easily calculated from well-known formulæ, taking into account the initial and final pressures, the volume, and the temperature. Against this energy expended is measured the volume and pressure of air in the tanks 4 and 34. The work done divided by the energy consumed is the efficiency of the machine, which efficiency may vary according to certain standards. In any case when the efficiency falls below a certain per cent. the operator will know that the parts should be replaced.

Having thus described my invention, so that the same may be readily understood by those skilled in the art to which it appertains, what I claim, and desire to secure by Letters Patent, is—

1. A method of testing pneumatic tools and the like which consists in connecting said tool to a reciprocating piston, operating said piston to impinge against a body of water to compress a column of air, and measuring the air thus compressed in comparison with the energy consumed by the tool.

2. A method of testing pneumatic tools and the like which consists in connecting the tool to a reciprocating piston, operating said piston to strike a series of impinging blows against a volume of water, registering the forward stroke of said piston by means of a compression-tank, registering the return stroke of said piston by means of a vacuum-tank, and measuring the sum of both forces in comparison with the energy supplied to said tool.

In witness whereof I have hereunto set my hand in the presence of two witnesses.

ROBERT ALLISON CHAMBERS.

Witnesses:
STUART R. W. ALLEN,
WILLIAM G. ARMSTRONG.